US006754716B1

(12) United States Patent
Sharma et al.

(10) Patent No.: US 6,754,716 B1
(45) Date of Patent: Jun. 22, 2004

(54) RESTRICTING COMMUNICATION BETWEEN NETWORK DEVICES ON A COMMON NETWORK

(75) Inventors: Rosen Sharma, Mountain View, CA (US); Srinivasan Keshav, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/502,155

(22) Filed: Feb. 11, 2000

(51) Int. Cl.[7] .............................................. G06F 13/00
(52) U.S. Cl. ...................... 709/238; 709/230; 709/250
(58) Field of Search ................................ 709/217, 219, 709/220, 223, 224, 225, 230, 238, 245, 249, 250

(56) References Cited

U.S. PATENT DOCUMENTS

| 3,377,624 A | 4/1968 | Nelson et al. |
| 4,177,510 A | 12/1979 | Appell et al. ............... 364/200 |
| 5,212,793 A | 5/1993 | Donica et al. |
| 5,226,160 A | 7/1993 | Waldron et al. |

(List continued on next page.)

FOREIGN PATENT DOCUMENTS

| WO | WO 99/39261 | 8/1999 |

OTHER PUBLICATIONS

Boehm, B., "Managing Software Productivity and Reuse," IEEE Computer, vol. 32, No. 9, Sep. 1999, 3 pages.
Corbato, F. J. et al. "An Experimental Timesharing System," Proceedings of the American Federation Of Information Processing Societies Spring Joint Computer Conference, San Francisco, CA, May 1–3, 1962, pp. 335–344.
Deutsch, P. and Grant, C.A., "A Flexible Measurement Tool for Software Systems," Information Processing 71 (Proc. of the IFIP Congress), 1971, pp. 320–326.
Edjlali, G., et al., "History–based Access Control for Mobile Code," Fifth ACM Conference on Computer and Communication Security, Nov. 3–5, 1998, 19 pages.
Erlingsson, U. and Schneider, F. B., "SASI Enforcement of Security Policies: A Retrospective," Proc. New Security Paradigms Workshop, Apr. 2, 1999, pp. 1–17.
Evans, D. and Twyman, A., "Flexible Policy–Directed Code Safety," Proc. of 1999 IEEE Symposium on Security and Privacy, Oakland, CA, May 9–12, 1999, pp. 1–14.
Fraser, T. et al., "Hardening COTS Software with Generic Software Wrappers," Proc. of 1999 IEEE Symposium on Security and Privacy, 1999, 15 pages.
Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

(List continued on next page.)

*Primary Examiner*—Viet D. Vu
(74) *Attorney, Agent, or Firm*—Fenwick & West LLP

(57) ABSTRACT

Communications between network devices on a logical subnet are restricted between devices authorized to communicate with each other, even though other network devices may be present on the subnet. When a network device receives a request to provide it L2 address to a requesting network device, it responds with its L2 address only if the requesting device is authorized to request L2 address. Optionally, a network device only transmits requests for the L2 addresses of other devices if it authorized to do so. The information describing authorized devices maybe store as list of L2 and L3 addresses, which list may be loaded by each network device when starting up. Preferably, authorized devices include routers on the device's logical subnet, to allow the routers to communicate with, and route packets to, the network devices.

15 Claims, 5 Drawing Sheets

U.S. PATENT DOCUMENTS

| | | |
|---|---|---|
| 5,249,290 A | 9/1993 | Heizer |
| 5,263,147 A | 11/1993 | Francisco et al. ............ 395/425 |
| 5,325,530 A | 6/1994 | Mohrmann |
| 5,437,032 A | 7/1995 | Wolf et al. |
| 5,528,753 A | 6/1996 | Fortin |
| 5,572,680 A | 11/1996 | Ikeda et al. |
| 5,584,023 A | 12/1996 | Hsu |
| 5,603,020 A | 2/1997 | Hashimoto et al. ......... 395/616 |
| 5,636,371 A | 6/1997 | Yu ............................. 395/500 |
| 5,640,595 A | 6/1997 | Baugher et al. |
| 5,692,047 A | 11/1997 | McManis ....................... 380/4 |
| 5,706,097 A | 1/1998 | Schelling et al. ........... 358/296 |
| 5,706,453 A | 1/1998 | Cheng et al. |
| 5,708,774 A | 1/1998 | Boden |
| 5,719,854 A | 2/1998 | Choudhury et al. |
| 5,727,203 A | 3/1998 | Hapner et al. |
| 5,748,614 A | 5/1998 | Wallmeier |
| 5,752,003 A | 5/1998 | Hart |
| 5,761,477 A | 6/1998 | Wahbe et al. ........... 395/406 A |
| 5,764,889 A * | 6/1998 | Ault et al. |
| 5,781,550 A | 7/1998 | Templin et al. ............. 370/401 |
| 5,799,173 A | 8/1998 | Gossler et al. |
| 5,809,527 A | 9/1998 | Cooper et al. .............. 711/133 |
| 5,828,893 A | 10/1998 | Weid et al. .................. 395/800 |
| 5,838,916 A | 11/1998 | Domenikos et al. ... 395/200.49 |
| 5,842,002 A | 11/1998 | Schnurer et al. ............ 395/500 |
| 5,845,129 A | 12/1998 | Wendorf et al. ............ 395/726 |
| 5,850,399 A | 12/1998 | Ganmukhi et al. |
| 5,860,004 A | 1/1999 | Fowlow et al. |
| 5,864,683 A | 1/1999 | Boebert et al. |
| 5,889,996 A | 3/1999 | Adams |
| 5,892,968 A | 4/1999 | Iwasaki et al. |
| 5,905,730 A | 5/1999 | Yang et al. |
| 5,905,859 A * | 5/1999 | Holloway et al. .......... 713/201 |
| 5,913,024 A | 6/1999 | Green et al. ................. 395/186 |
| 5,915,085 A | 6/1999 | Koved ........................ 395/186 |
| 5,915,095 A | 6/1999 | Miskowiec |
| 5,918,018 A | 6/1999 | Gooderum et al. .... 395/200.55 |
| 5,920,699 A * | 7/1999 | Bare .......................... 709/225 |
| 5,933,603 A | 8/1999 | Vahalia et al. |
| 5,937,159 A | 8/1999 | Meyers et al. ......... 395/187.01 |
| 5,956,481 A | 9/1999 | Walsh et al. ................. 395/186 |
| 5,978,373 A * | 11/1999 | Hoff et al. .................. 370/392 |
| 5,987,524 A * | 11/1999 | Yoshida et al. ............. 709/245 |
| 5,991,812 A | 11/1999 | Srinivasan |
| 5,999,963 A | 12/1999 | Bruno et al. |
| 6,016,318 A | 1/2000 | Tomoike |
| 6,018,527 A | 1/2000 | Yin et al. |
| 6,023,721 A | 2/2000 | Cummings .................. 709/201 |
| 6,038,608 A | 3/2000 | Katsumanta |
| 6,038,609 A | 3/2000 | Geulen |
| 6,047,325 A | 4/2000 | Jain et al. |
| 6,055,617 A | 4/2000 | Kingsbury |
| 6,553,413 B1 | 4/2000 | Leighton et al. |
| 6,061,349 A | 5/2000 | Coile et al. |
| 6,065,118 A | 5/2000 | Bull et al. ................... 713/200 |
| 6,075,791 A | 6/2000 | Chiussi et al. |
| 6,075,938 A | 6/2000 | Bugnion et al. ....... 395/500.48 |
| 6,078,957 A | 6/2000 | Adelman et al. |
| 6,086,623 A | 7/2000 | Broome et al. |
| 6,092,178 A | 7/2000 | Jindal et al. |
| 6,094,674 A | 7/2000 | Hattori et al. |
| 6,101,543 A | 8/2000 | Alden et al. |
| 6,108,701 A | 8/2000 | Davis et al. |
| 6,108,759 A | 8/2000 | Orcutt et al. ............... 711/173 |
| 6,122,673 A | 9/2000 | Basak et al. |
| 6,154,776 A | 11/2000 | Martin |
| 6,154,778 A | 11/2000 | Koistinen et al. |
| 6,167,520 A | 12/2000 | Touboul ..................... 713/200 |
| 6,172,981 B1 * | 1/2001 | Cox et al. ................... 370/401 |
| 6,192,389 B1 | 2/2001 | Ault et al. .................. 709/101 |
| 6,192,512 B1 | 2/2001 | Chess ............................ 717/5 |
| 6,230,203 B1 | 5/2001 | Koperda et al. |
| 6,240,463 B1 | 5/2001 | Benmohamed et al. |
| 6,247,057 B1 | 6/2001 | Barrera |
| 6,269,404 B1 | 7/2001 | Hart et al. |
| 6,279,039 B1 | 8/2001 | Bhat et al. |
| 6,279,040 B1 | 8/2001 | Ma et al. |
| 6,282,581 B1 * | 8/2001 | Moore et al. |
| 6,282,703 B1 | 8/2001 | Meth et al. |
| 6,286,047 B1 | 9/2001 | Ramanathan et al. |
| 6,298,479 B1 | 10/2001 | Chessin et al. |
| 6,314,558 B1 | 11/2001 | Angel et al. |
| 6,327,622 B1 | 12/2001 | Jindal et al. |
| 6,336,138 B1 | 1/2002 | Caswell et al. |
| 6,351,775 B1 | 2/2002 | Yu |
| 6,353,616 B1 | 3/2002 | Elwalid et al. |
| 6,363,053 B1 | 3/2002 | Schuster et al. |
| 6,381,228 B1 | 4/2002 | Prieto, Jr. et al. |
| 6,385,638 B1 | 5/2002 | Baker-Harvey |
| 6,389,448 B1 | 5/2002 | Primak et al. |
| 6,393,484 B1 * | 5/2002 | Massarani ................... 709/227 |
| 6,425,003 B1 | 7/2002 | Herzog et al. |
| 6,430,622 B1 | 8/2002 | Aiken, Jr. et al. |
| 6,434,631 B1 | 8/2002 | Bruno et al. |
| 6,434,742 B1 | 8/2002 | Koepele, Jr. |
| 6,438,134 B1 | 8/2002 | Chow et al. |
| 6,457,008 B1 | 9/2002 | Rhee et al. |
| 6,463,459 B1 | 10/2002 | Orr et al. |
| 6,470,398 B1 | 10/2002 | Zargham et al. |
| 6,487,578 B2 | 11/2002 | Ranganathan |
| 6,490,670 B1 | 12/2002 | Collins et al. |
| 6,499,137 B1 | 12/2002 | Hunt |
| 6,529,950 B1 | 3/2003 | Lumelsky et al. |
| 6,542,167 B1 | 4/2003 | Darlet et al. |
| 6,578,068 B1 * | 6/2003 | Bowman-Amuah |
| 6,580,721 B1 * | 6/2003 | Beshai |

OTHER PUBLICATIONS

Goldberg, R. P., "Survey of Virtual Machine Research," IEEE Computer, Jun. 1974, pp. 34–45.

Pandey, R. and Hashii, B., "Providing Fine–Grained Access Control For Mobile Programs Through Binary Editing," Technical Report TR98 08, University of California, Davis, CA, 1998, pp. 1–22.

Ritchie, D. M., "The Evolution of the Unix Time–Sharing System," AT&T Bell Laboratories Technical Journal 63, No. 6, Part 2, Oct. 1984, (originally presented 1979), 11 pages.

Saltzer, J., H. anbd Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/>.

Wahbe, R., et al., "Efficient Software–Based Fault Isolation," Proc. of the Symposium on Operating System Principles, 1993, 14 pages.

Goyal, P. et al., "Start–time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL:http://cs.cornell.edu/Info/Courses/Spring–97/CS614/goy.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," serial number 09/452,286, filing date Nov. 30, 1999.

Pending United States patent application entitled "Selective Interception of System Calls," serial number 09/499,098, filing date Feb. 4, 2000.

Pending United States patent application entitled "Dynamic Scheduling of Task Streams in a Multiple–Resource System to Ensure Task Stream Quality of Service," serial number 09/498,450, filing date Feb. 4, 2000.

Pending United States patent application entitled "Disambiguating File Descriptors," serial number 09/500,212, filing date Feb. 8, 2000.

Keshav, S., *An Engineering Approach to Computer Networking: ATM Networks, the Internet, and the Telephone Network*, Reading, MA, Addison–Wesley, 1997, pp. vii–xi, 85–115, 209–355, 395–444.

Stevens, R. W., *UNIX Network Programming Volume 1 Networking APIs: Sockets and XTI*, Upper Saddle River, NJ, Prentice Hall, 1998, pp. v–xiv, 29–53, 85–110, 727–760.

Tanenbaum, A. S. and Woodhull, A. S., *Operating Systems: Design and Implementation*, Upper Saddle River, NJ, Prentice Hall, 1997, pp. vii–xiv, 1–46, 401–454.

Rubini, A., *LINUX Device Drivers*, Sebastopol, CA, O'Reilly & Associates, Inc., 1998, pp. v–x, 13–40.

Goyal, P., et al., "A Hierarchical CPU Scheduler for Multimedia Operating Systems," *Proceedings of the Second Symposium on Operating Systems Design and Implementations* (OSDI'96), Seattle, WA, Oct. 1996, 15 pages.

Laurie, B. and Laurie, P., *Apache The Definitive Guide*, Sebastopol, CA, O'Reilly & Associates, Inc., Feb. 1999, pp. v–viii, 43–74.

Aho, A. V. and Ullman J. D., *Principles of Complier Design*, Reading, MA, 1977, pp. vii–x, 359–362, 519–522.

Jonsson, J., "Exploring the Importance of Preprocessing Operations in Real–Time Multiprocessor Scheduling," *Proc. of the IEEE Real–Time Systems, Symposium—Work–in–Progress session*, San Francisco, CA, Dec. 4, 1997, pp. 31–34.

Rusling, D. A., Processes, [online], [retrieved on Dec. 7, 1999]. Retrieved from the Internet: <URL: http://www.cebaf.gov/~saw.linux/tlk–html/node44.html>.

Rusling, D. A., Linux Processes, [online], [retrieved on Dec. 7, 1999]. Retrieved from the Internet: <URL:http://www.cebaf.gov/~saw.linux/tlk–html/node45.html>.

Rusling, D. A., Identifiers, [online], [Retrieved on Dec. 7, 1999]. Retrieved from the Internet: <URL: http://www.cebaf.gov/~saw.linux/tlk–html/node46.html>.

Rusling, D. A., Scheduling, [online], [retrieved on Dec. 7, 1999]. Retrieved from the Internet: <URL: http://www.cebaf.gov/~saw.linux/tlk–html/node47.html>.

Rusling, D. A., Scheduling in Multiprocessor Systems, [online], [retrieved on Dec. 7, 1999]. Retrieved from the Internet: <URL:http://www.cebaf.gov/~saw.linux/tlk–html/node48.html>.

Rusling, D. A., Files, [online], [retrieved on Dec. 7, 1999]. Retrieved from the Internet: <URL: http://www.cebaf.gov/~saw.linux/tlk–html/node49.html>.

Plummer, D. C., *An Ethernet Address Resolution Protocol— or —Converting Network Protocol Addressed to 48.bit Ethernet Address for Transmission on Ethernet Hardware*, Nov. 1982, [online], [retrived on Jan. 17, 2000]. Retrieved from the Internet: <URL: http://www.msg.net/kadow/answers/extras/rfc/rfc826.txt>.

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference Cambridge, MA, Aug. 30, 1999–Sep. 3, 1999. pp. 95–108.

Campbell, A. T. and Keshav, S., "Quality of Service in Distributed Systems," *Computer Communications 21*, 1998, pp. 291–293.

Bach, M. J., *The Design of the Unix® Operating System*, New Delhi, Prentice–Hall of India, 1989, pp. v–x, 19–37.

McDougall, R., et al., *Resource Management*, Upper Saddle River, NJ, Prentice Hall, 1999, pp. iii–xix, 135–191.

Rijsinghani, A., RFC 1624, May 1994, [online], [retrived on Feb. 2, 2000]. retrived from the internet: <URL:http://www.faqs.org/rfcs/rfc1624.html>.

Mallory, T and Kullberg, A., RFC 1141, Jan. 1990 [online], [retrived on Feb. 2, 2000]. retrived from the Internet: <URL:http://www.faqs.org/rfcs/rfc1141.html>.

Egevang, K. and Francis P., RFC 1631, May 1994 [online], [retrived on Feb. 2, 2000]. retrived from the Internet: <URL:http://www.faqs.org/rfcs/rfc1631.html>.

Goyal, Pawan et al., *Generalized Guaranteed Rate Scheduling Algorithms: A Framework*, IEEE/ACM Transactions, vol. 5, Issue: Aug. 4, 1997; pp. 561–571.*

Symbol Table, [online]copyright 1997, 1998, [Retrieved on Apr. 4, 2003] Retrieved from the internet <URL: http://216.239.33.100/search∞q=
cache:eASXk8qC_AC:www.caldera.com/developers/gabi/1998–04–29/ch4.s.. ., pp. 1–5.

* cited by examiner

RESTRICTING COMMUNICATION BETWEEN NETWORK DEVICES ON A COMMON NETWORK

BACKGROUND

1. Field of Invention

The present invention relates generally to managing communications on a computer network, and more particularly, to restricting communication between selected network devices.

2. Background of the Invention

Computer networks allow many network devices to communicate with each other and to share resources. In order to transmit a packet of data from one network device to another on a local area network (LAN), the sending device must have the local area address of the destination device, and in particular, must have a Layer 2 (L2) or media access control (MAC) address that uniquely specifies the individual hardware device that is to receive the packet. In an Ethernet LAN, each network device has a network interface card, which has a unique Ethernet address. In an FDDI LAN, each device likewise will have a unique MAC address.

Typically, all of the devices on a LAN are allowed to communicate with each other, and thus, there are provided various mechanisms by which devices learn the L2 addresses of other devices in order to transmit packets to them. In an Ethernet network, the Address Resolution Protocol (ARP) defined in RFC 826 is used to convert protocol addresses, such as IP addresses, to L2 addresses, such as Ethernet addresses. In this protocol, a first network device broadcasts a request that includes the IP address that it wants to transmit a packet to (the destination IP address), and its own IP and Ethernet addresses. Since the request is broadcast all devices on the network receive it. However, only the second network device that has the requested destination IP address responds by sending back its Ethernet address. The first network device can now transmit packets directly to the second network device.

This type of address discovery is acceptable on networks where it is desirable for all devices to communicate with each other. However, it may be desirable to provide a computer network in which devices are restricted from communicating with each other generally. For example, an Internet Server Provider (ISP) may wish to support computers from many different customers on the same network. In order to ensure the privacy and integrity of each customer's data and applications, it is desirable to prevent the customers' computers from communicating with each other, for example to prevent malicious tampering with data. This has been done conventionally by isolating each customer's computers and devices to its own subnet. However, this approach is expensive and complex to manage because isolating a subnet from others requires special-purpose hardware (such as a bridge), special-purpose software (such as that in a router) or both. In some instances, the necessary isolation may be impossible, for example, where the ISP provides virtual servers (multiple different servers for different customers) on a single host computer.

Thus, in those instances where it is desirable to have multiple customers sharing a subnet, it is further desirable to prevent their respective devices from communicating with each other.

SUMMARY OF THE INVENTION

The present invention makes it possible to restrict communications between network devices on a common subnet. In particular, any network device can be restricted to communicating only with a predefined set of authorized or validated network devices.

In one aspect of the present invention, network devices are restricted from providing their network addresses to other than previously authorized devices. For example, a network device may not respond to ARP requests that seek to know its L2 address, unless the requesting device itself has a validated network address, which indicates that it is authorized to request L2 addresses of other devices. Because a network device is prohibited from revealing its L2 address to unauthorized devices, these unauthorized devices will not be able to send packets to the network device. In another aspect of the present invention, network devices are prevented from discovering the L2 network addresses of other devices, unless authorized to do so. Because an unauthorized device cannot discover the network addresses of other devices, it cannot communicate with them.

In one embodiment, a subnet of a computer network includes a number of network devices, such as computers, printers, routers, bridges, and so forth. Each device has a unique L2 address (e.g., an Ethernet address), and an assigned IP address. Only certain devices on the network are authorized to determine, via an address resolution protocol such as ARP, the L2 addresses of other network devices. These authorized devices are preferably routers that are attached to the subnet; however, other network devices may also be authorized, for example, a computer operated by a system administrator. A list of the IP addresses of these authorized devices is stored in each of the network devices, preferably in a privileged area, such as in the operating system kernel. The authorized IP address list is preferably loaded by each network device upon start up. The authorized IP address list may be updated periodically by a system administrator to reflect newly authorized devices, or to remove previously authorized devices.

According to the first aspect of the invention, when a first network device seeks to communicate with a second network device, the first network device broadcasts an ARP request, including its own IP and L2 addresses, and the IP address of the second network device. The second network device receives this request packet. However, instead of responding as described in ARP, it compares the IP address of the first network device to the list of authorized IP addresses. If the IP address of the first network device is not on the list, then the second network device does not reply to the request packet, but instead remains "silent."

This prevents the first network device from discovering the L2 address of the second network device, and thereby directing any packets to it. If the IP address of the first network device is on the list of authorized IP addresses, then the second network device replies in the normal fashion with its L2 address.

In accordance with the ARP, the second network device maintains a translation table that maps L2 addresses to IP addresses and protocol types. Conventionally, whenever a network device receives an ARP request, is updates this translation table to include the L2 address and IP address of the requesting device. However in a preferred embodiment, the second network device does not automatically update the translation table, but rather only if the first network device is authorized to request L2 addresses. This feature is further desirable to prevent IP spoofing attacks on the second network device.

As a further enhancement according to the second aspect of the invention, before a first network device sends an ARP request, it compares it own IP address with the list of authorized IP addresses. If its own IP address is not on the list, then it does not send request packet. This feature further prevents the network device from discovering the network addresses of other devices.

These features of the present invention may be embodied in various forms. In one implementation, each network device includes a memory storing a TCP/IP protocol stack. The protocol stack is responsible for moving packets from one layer of the network to another. The protocol stack includes an ARP component that implements the ARP (called the address resolution module in RFC 862). In one embodiment, this ARP component is modified to compare the IP address of a requesting network device to a list of authorized IP addresses before replying with its own L2 address. If the IP address is not authorized, then the ARP component does not respond. Preferably, the ARP component also does not update its translation table if the IP address is not authorized. The ARP component may be further modified to test the IP address of the network device itself before transmitting an ARP request on behalf of the network device in which it is included.

Yet another embodiment of the present invention is a computer subnet administered by an ISP. Various computers are coupled to the subnet, each of which may be dedicated to one customer or to multiple customers (e.g., where multiple customers have their own private servers including distinct L2 addresses). The ARP of each computer/server is modified as just described to restrict responses to ARP requests to only those requests coming from authorized network devices. The ARP component may be further modified to prevent ARP requests from being generated on any other but authorized devices.

These and other features and attributes of the present invention are now described in more detail with reference to the following figures.

DETAILED DESCRIPTION OF THE PREFERRED EMBODIMENT

Figure 1:
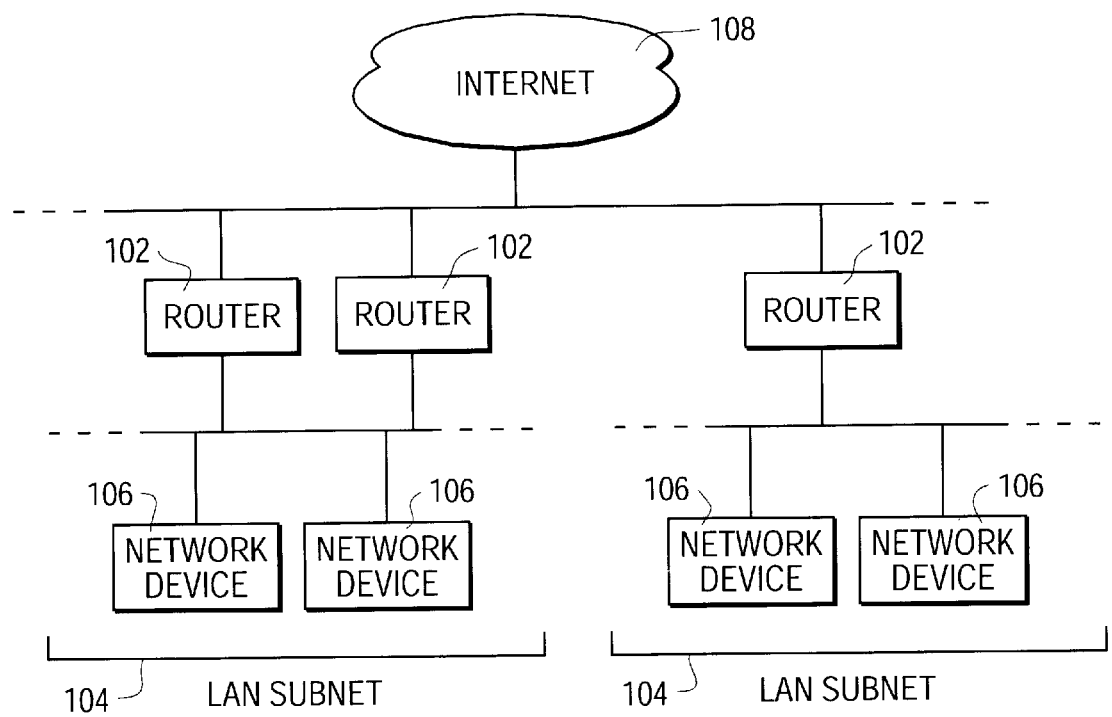
FIG. 1 is a network diagram in accordance with the present invention.

Referring now to FIG. 1, there is shown a simplified network diagram of a computer network that may be used in conjunction with the present invention. The network 100 includes various LAN subnets 104, coupled together over a communication medium 100, such as an Ethernet network, FDDI, or the like. Each subnet 104 includes a number of host computers 106, and one or more routers 102, which server to route packets between hosts on the network. In this description, "host", and "network device" are used interchangeably, and include both physical and virtual devices. In particular, a host may be one of several virtual servers executing on a single physical computer; each virtual server presents to other devices on the network functionality substantially similar to that of a physical host computer or a physical network device. The hosts and routers are both examples of network devices generally; other types of network devices, e.g., printers, bridges, brouters, etc., are not illustrated. The subnets 104 may be coupled, as illustrated to a public communications network 108, such the Internet, through conventional hardware interfaces and communications protocols. The physical implementation of a network such as illustrated is well known to those of skill in the art.

Figure 2:
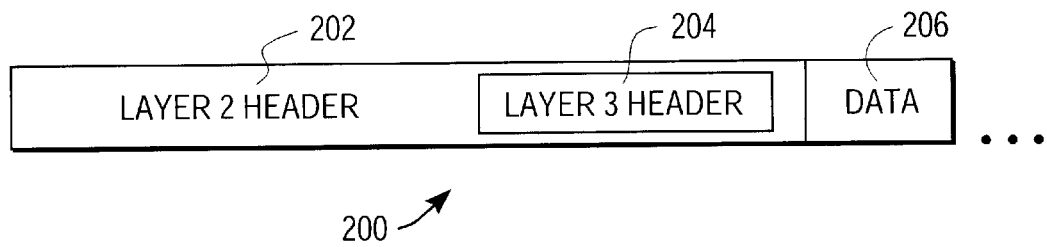
FIG. 2 is a simplified illustration of a typical packet.

FIG. 2, by way of further background, illustrates a portion of a data packet 200 as may be transmitted over the network 100. A packet 200 includes a layer 2 header 202, including the L2 addresses of the source host 106 and destination host computer (if known), and protocol (L3) header 204. The protocol header 204 includes the protocol addresses of the source and destination hosts, for example, their IP (Internet Protocol) addresses. A data portion 206 contains the data or payload the packet (and itself may contain additional information useful in protocol decoding or routing of the packet.

Figure 3:
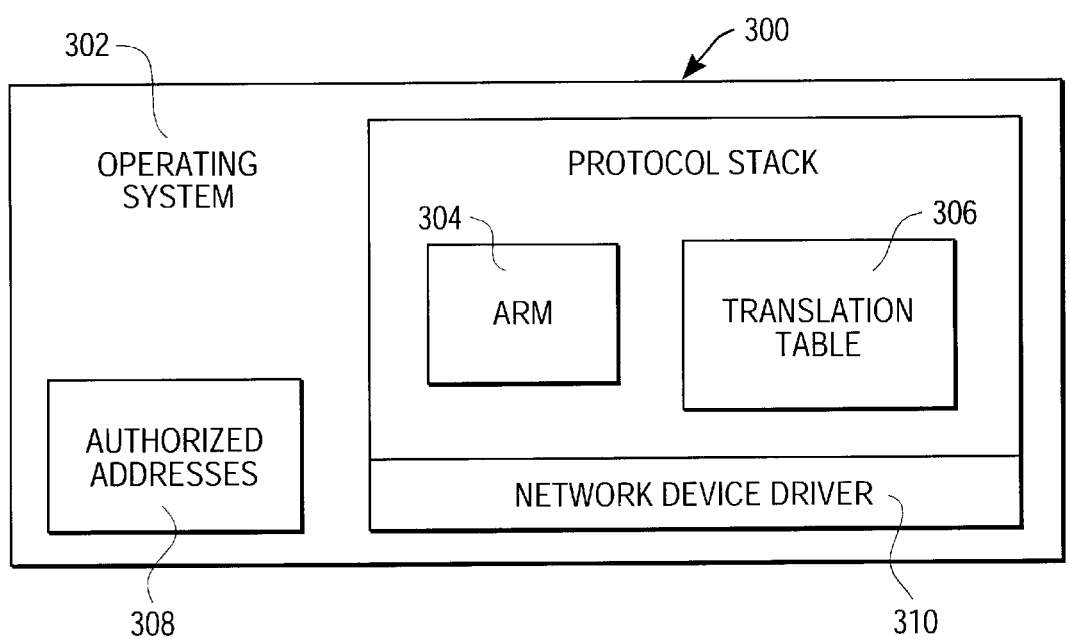
FIG. 3 is a flowgraph of the operation of one embodiment of the present invention.

The host computers 106 are generally conventional having an addressable memory for storing applications and data, and executing such application. Again, a single physical computer may contain multiple virtual servers (each being a host), with the physical memory partitioned between the various virtual servers. FIG. 3 illustrates the memory 300 of a host computer 106 in accordance with the present invention; each host (physical or virtual) shares these characteristics. The memory 300 stores an operating system 302, such as a flavor of UNIX®, Microsoft Corp.'s WINDOW®, or the like, for execution by the host's processor. Preferably embedded in the operating system kernel is a protocol stack 305, that includes an address resolution module (ARM) 304 that is modified in accordance with the teachings of the present invention. The protocol stack 305 is preferably TCP/IP but may be implemented using other protocols (e.g., UDP). The ARM 304 is a software product that provides an implementation of the Address Resolution Protocol that is enhanced by the teachings of the present invention, as further described below. The ARM 304 maintains a translation table that maps protocol addresses (e.g. Internet Protocol) to L2 addresses, to allow the host to determine one type of address given another. As with conventional ARMs, ARM is capable of mapping many different protocols to hardware addresses, by storing in the translation table 306 the protocol type associated with each protocol address/ hardware address pair. Thus, while the preferred embodiment, as described here, uses IP addresses as an example, the present invention is not limited to working with IP addresses only.

Memory 300 includes a network device driver 310 that communicates with a network interface card (not shown) to transmit and receive packets from the network. The network device driver 310 communicates with the ARM 304 to resolve IP addresses to L2 addresses.

Also stored in the memory 300 is a list 308 of authorized protocol address and L2 address pairs. These are the protocol addresses and L2 addresses of one or more network device that are authorized to discover the L2 addresses of other network devices on the subnet 104. In a preferred embodiment, the protocol addresses are IP addresses, and the L2 addresses are Ethernet addresses, but other types of addresses may be used, depending on the network architecture. The list 308 is maintained, for example, by a network administrator, who updates the list as newly authorized devices are coupled to the subnet 104, or as they are removed therefrom. The list 308 is preferably stored in the operating system kernel, so that only those with a root level password may modify it; alternatively, it may be stored in user accessible portions of the memory 300. Finally, the list 308 need not take any specific implementation, and may be a table, a linked list, a tree, a collection of objects, or the like.

The network devices selected for inclusion on the list 308 of authorized devices may depend on the particular devices that are on the subnet 104. In one embodiment, the list contains only the addresses of the routers 102. This allows the routers 102 to discover which hosts 106 are on the subnet 104 and route packets to them, but does not allow hosts to discover and communicate with each other. The set of authorized devices may include, in addition to routers, other devices that are hosted on behalf of a single customer. This may be other host computers host for the customer, or specialized computing resources such as special-purpose printers or storage devices. In addition, the list 308 may contain the addresses of selected hosts 104, for example hosts used by a network administrator.

The list of authorized addresses is preferably loaded by a host each time the host reboots. This ensures that the list is available for use as soon as it becomes necessary to either receive or respond to a packet. In one preferred embodiment, each host stores the IP address of a router 102 on its subnet. After booting, a host immediately does an ARP for this IP address. This returns to it the L2 address of the router 102. It stores this L2 address in its list 308 of authorized addresses in conjunction with the router's IP address. Storing both the protocol address and the L2 address allows the ARM to thwart attempts at. IP spoofing, that is, network devices that fake the IP addresses of authorized devices in order to obtain access to restricted hosts.

Figure 4:
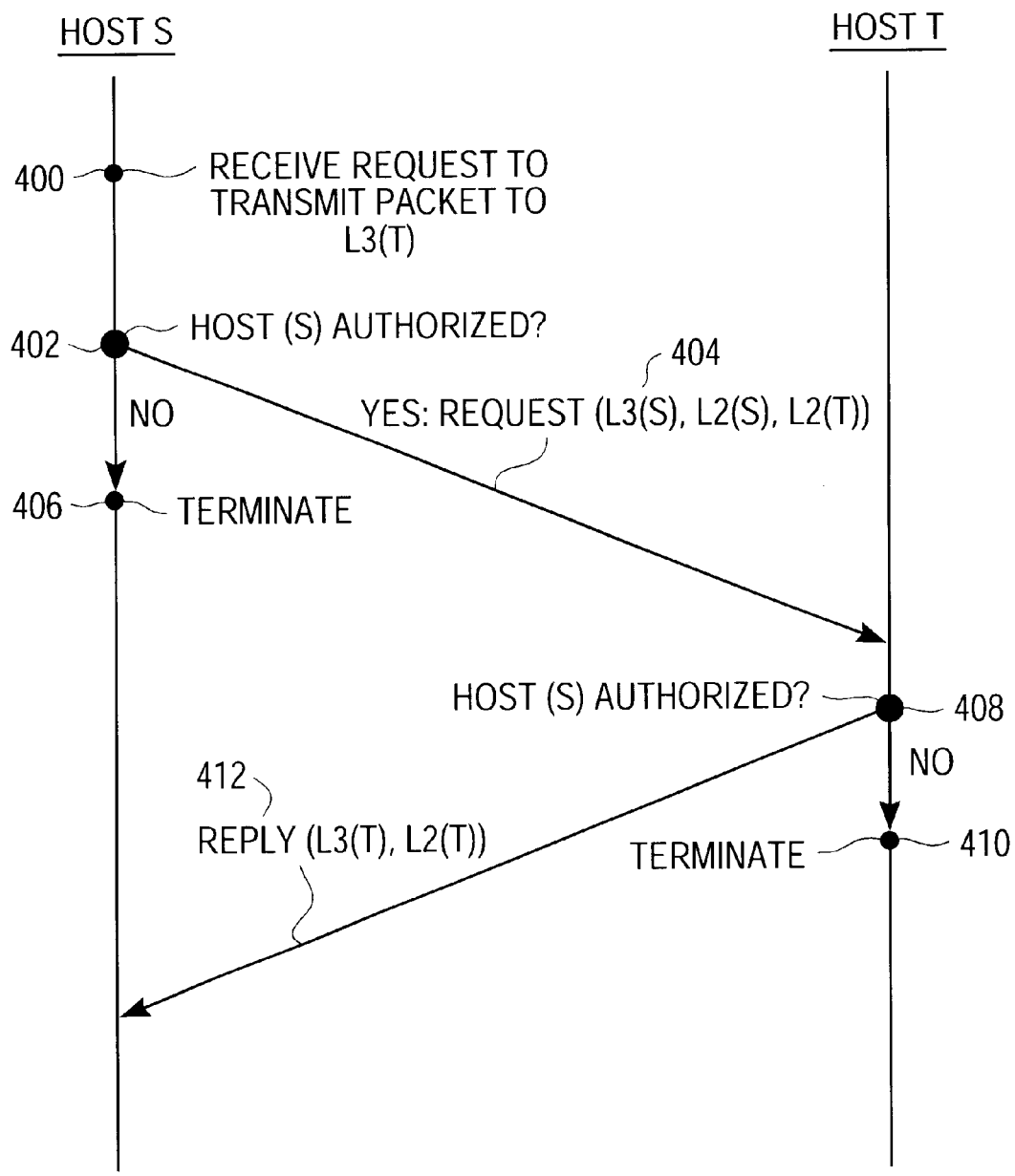
FIG. 4 is a sequence diagram of the functional operation of two network devices in accordance with the present invention.

FIG. 4 illustrates a sequence diagram illustrating the functional operation of two host. computers in accordance with the present invention. In FIG. 4, the following notation is used. The two hosts are a source host "S" which is seeking to determine the L2 address of a target host "T". Each host S and T has a protocol address, designated on the figure as PA(S) and PA(T). They also each have an L2 address, designated L2(S) and L2(T). Each host further executes its own ARM 304, here designated ARM(S) for host S, and ARM(T) for host T.

Host S's network device driver 310 receives 400 a request to transmit a packet to a target computer, e.g., host T, known only by the target's protocol address, PA(T) and the protocol type, for example Internet Protocol. The request may be created by a client application executing, on the host S, for example, or from some other source. The network device driver 310 provides ARM(S) with the protocol type and PA(T) in order for the ARM(S) to determine the correct L2 address corresponding to PA(T).

ARM(S) optionally determines 402 whether host S is authorized to request the L2 addresses of other devices, preferably by comparing PA(S), which it knows, with the list 308 of authorized protocol addresses. If host S is not authorized, and thus PA(S) is not an authorized protocol address included in this list, ARM(S) discards the request, and terminates 406, taking no further action. If PA(S) is included in the list 308, then ARM(S) generates a ARP request packet, including, PA(S), L2(S), and PA(T), and causes this packet to be broadcast 404 to the all network segments that are logically part of the subnet of host S. If the optional comparison 402 is not performed, then ARM(S) simply generates 404 the packet directly.

The request packet is received by all network devices, but discarded by all except host T, since host T recognizes its own PA(T). ARM(T) receives this packet, and determines 408 whether host S is authorized to request L2 addresses. This is done, in one embodiment by comparing PA(S) and L2(S) with the list 308 of authorized addresses: if PA(S) and L2(S) are included in the list 308, then host S is authorized. If not, the ARM(T) discards the packet and does not reply, terminating 410 further processing. This prevent host S from discovering host T's existence on the subnet 104 entirely, and thus prevents host S from communicating (e.g. sending packets) with host T.

If host S's PA(S) and L2(S) form an authorized address pair, then the ARM(T) creates a reply packet to be transmitted 412 to host S according to the provided PA(S) and L2(S). This packet includes host T's L2 and protocol addresses, L2(T) and PA(T). When host S receives the reply packet, ARM(S) updates its translation table 306 to include the pairing of host T's L2 and protocol addresses L2(T) and PA(T). At this point, host S can now transmit packets to host T.

Note that the determination 402 by ARM(S) of the authorization of host S to send ARP requests is entirely optional: it is sufficient to prevent unauthorized discovery of host using just the verification steps by the receiving ARM (T).

Figure 5:
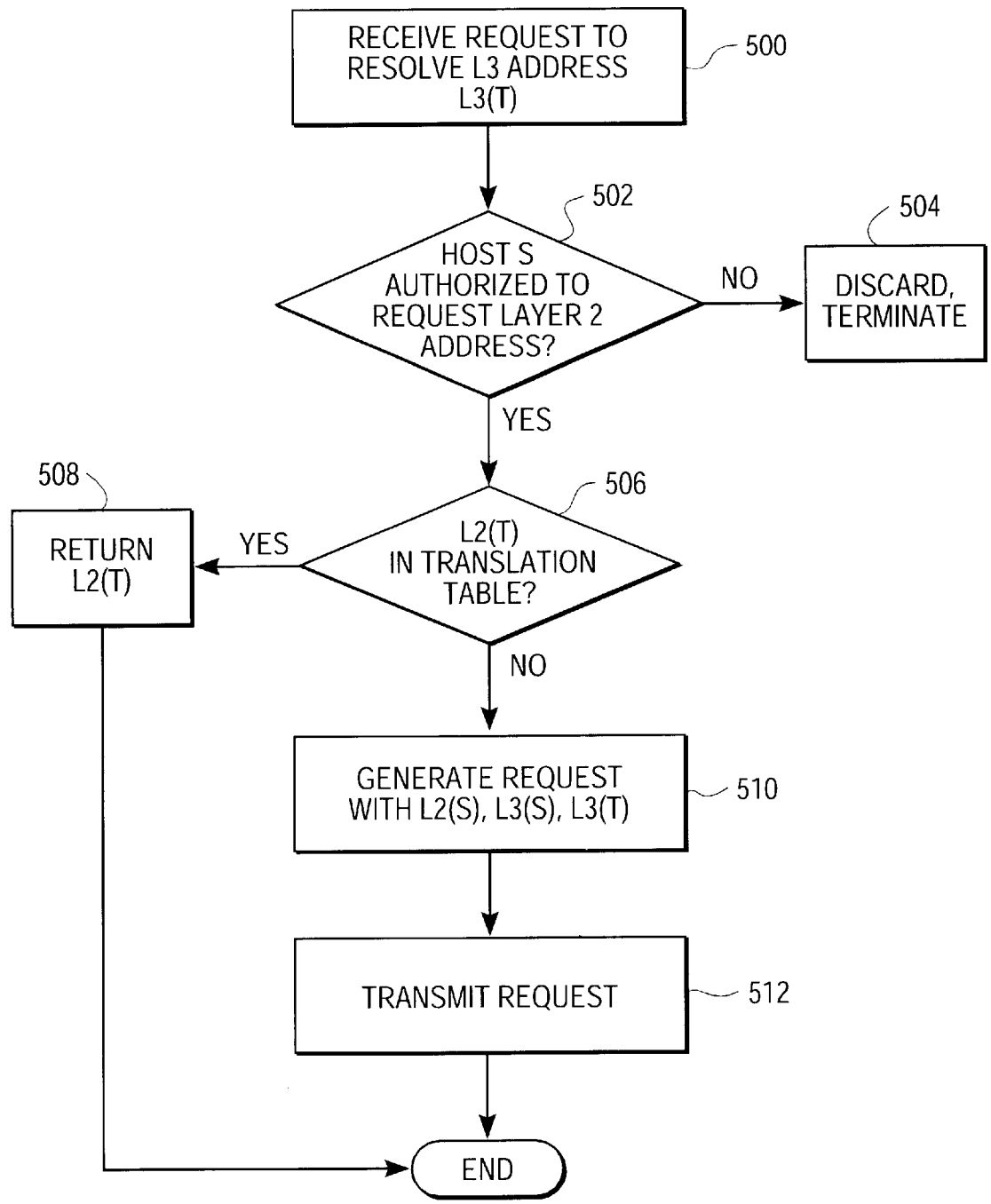
FIG. 5 is a flowchart of the packet generation function of an Address Resolution Protocol (ARP) component.
Figure 6:
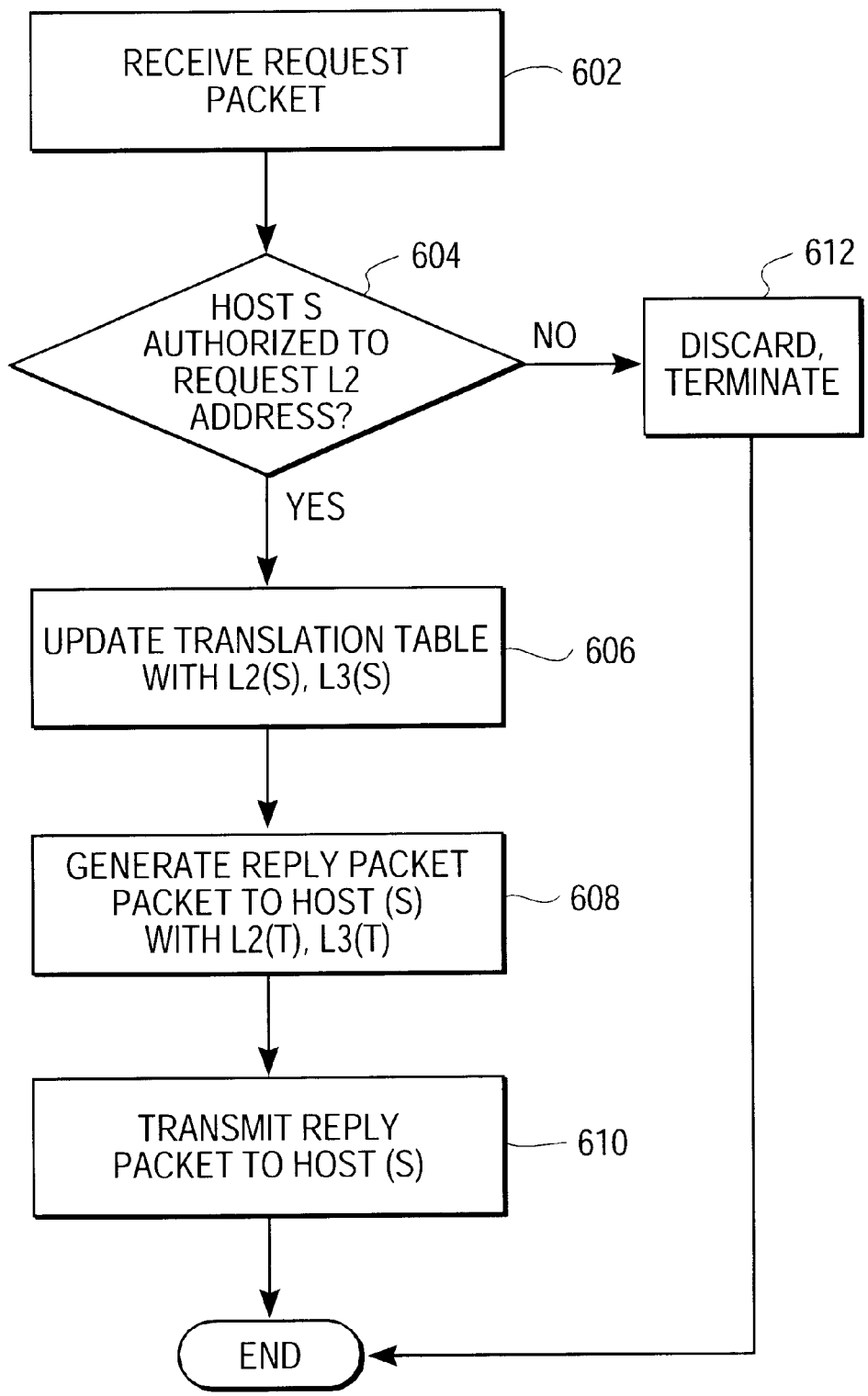
FIG. 6 is a flowchart of the packet reception function of an ARP component.

FIGS. 5 and 6 illustrate flowcharts of the operation of an ARM 304 modified in accordance with one embodiment the present invention to effect the behaviors illustrated in FIG. 4. FIG. 5 illustrates the packet generation function of an ARM 304 in accordance with the present invention. The ARM receives 500 a request for the resolution of a particular protocol address of a target network device PA(T), and protocol type. For example, if the host is attempting to resolve another host T's IP address, then request would be for PA(T) and the IP protocol type.

The request is naturally being generated by the host computer 106 on which the ARM 304 executes, and thus the ARM knows the protocol address of this source host, say PA(S). The ARM determines 502 whether the host S is authorized to request L2 address, and specifically, whether PA(S) is included in the list 308 of authorized addresses. If the host protocol address is not included, then the request is not further processed 504. In particular, the ARM 304 does not even check its translation table 308 to determine whether the protocol address of host T has been previously mapped to an L2 address.

If the PA(S) is included in the list 308 of authorized addresses, then the ARM checks 506 the translation table to determine whether the PA(T) has been previously mapped to an L2 address for host T. If so, it returns 508 this L2 address, as L2(T).

If PA(T) has not been previously mapped, then the ARM generates 5 10 an ARP Request packet, including <PA(S), L2(S), PA(T)>. It then causes the network device driver 310 to broadcast 512 this ARP request onto the subnet. This packet will be received by host T, and responded to, preferably according to the principles described herein, though in some cases host T need not have an ARP component that operates according to the packet reception functions next described. That is, host T need not validate host S as an authorized network device, FIG. 6 illustrates the packet reception function of the ARM, as modified in accordance with the present invention. Generally, when a request packet is received by the network device driver 310 of a host device, it provides the packet to the ARM. The ARM receives 602 this packet, and determines 604 whether the PA(S) and the L2(S), the protocol and L2 addresses of the requesting host, form an authorized address pair in the list 308 of authorized addresses. If not, then the ARM discards 612 the packet, and does not further respond. Preferably, the ARM does not update its translation table 306 to include the mapping of the requesting host's protocol address PA(S) to its L2 address L2(S), thereby preventing the receiving host from communicating with the requesting host in the future, which is desired because it has been determined that the requesting host was not authorized.

If the protocol and L2 addresses of the requesting host S form an authorized address pair, when compared 604 to the list 308, then the ARM updates 606 its translation table 308 with L2 address and protocol address (if necessary) and generates 608 a reply packet, including its protocol address PA(T) and its L2 address L2(T), and addressed to the requesting host S at <PA(S), L2(S)>. The ARM causes 610 this packet to be transmitted back to the requesting host. When the host receives the packet, it will update its translation table 308 to include the protocol address PA(T) and L2 address L2(T) of the target host.

In one preferred embodiment, the implementation of this process and the modifications to the ARM specifically restrict network devices to communicating only with the routers 102 on their respective subnets 104. In this embodiment, the list 308 of authorized addresses is initialized to include just the protocol addresses of the router(s), and most preferably their IP addresses. These addresses are loaded when a host device boots up. The host then immediately requests an ARP on these protocol addresses to obtain the L2 address(es) of the router(s). Subsequently, each host 106 will then be able respond to an ARP request if and only if both the protocol and L2 addresses of the requesting network device match the IP address and L2 address of the router. This checking of both protocol address and L2 address prevent protocol spoofing, such as IP spoofing, where unauthorized network devices use the IP addresses of authorized devices in order to obtain information, such as L2 addresses, that is otherwise restricted to authorized device.

In summary then, the present invention provides separately but complementary features by which a host may neither discover another host's L2 address (verification of protocol address prior to ARP request), nor will it reveal its own L2 except to an authorized device (verification of protocol and L2 address prior to ARP reply).

The foregoing describes in details the features and benefits of the present in various embodiments. Those of skill in the art will appreciate that present invention is capable of various other implementations that operate in accordance with the foregoing principles and teachings. For example, the present invention is preferably used with the IP protocol, and Ethernet addresses. However, other protocols may be used. While the list of authorized addresses is a generalized approach, allowing robust general application of the present invention to authorize any type of network device, particular embodiments may utilize a single authorized address pair for a single authorized device, such as a router. This single address pair need not be stored in a list per se, but need only be stored so as to be accessible to each ARM. Storage of such an address pair in each ARM's address space, or in the operating system of each host is possible. Accordingly, this detailed description is not intended to limit the scope of the present invention, which is to be understood by reference the claims below.

We claim:

1. A computer-implemented method of restricting communication between network devices on an network, comprising:

receiving at a first network device a request from a second network device for the layer 2 address of the first network device;

replying to the request with the layer 2 address of the first network device only if a network address of the second network device is included in a set of network addresses of network devices authorized to request the layer 2 address of the first network device, the set being specifically associated with the first network device;

receiving on the second network device a request from a client software application to generate the request for the layer 2 address of the first network device having a specified protocol address; and transmitting the request for the layer 2 address to the first network device only if second network device is authorized to request layer 2 addresses of at least one other network device.

2. An internet service provider computer system, comprising:

a communications network;

at least one router coupled to the communications network, the router having a protocol address and a layer 2 address;

a plurality of network devices coupled to the communications network, including at least a fist network device having:

a protocol address and a layer 2 address; and a TCP/IP protocol stack having an address resolution module that is modified to respond to requests from a requesting network device for the layer 2 address of the network device only if an address of the requesting network device is included in a set of addresses of network devices authorized to request the layer 2 address of the first network device, the set being specifically associated with the first network device.

3. The system of claim 2, wherein the address resolution module generates requests for the layer 2 address of another network device having a specified protocol address only if the network device executing the address resolution module is authorized to request layer 2 addresses of other network devices.

4. The system of claim 2, further comprising:

a stored list of authorized address pairs, each authorized address pair including a protocol address and a layer 2 address; and wherein the address resolution module responds to a request for a layer 2 address only if the protocol address and the layer 2 address of the requesting network device match an authorized address pair on the stored list.

5. The system of claim 2, wherein the address resolution module responds to requests for layer 2 addresses only if the requesting network device is the router.

6. The system of claim 2, wherein the address resolution module responds to requests for layer 2 addresses only if the protocol address and the layer 2 of the requesting network device match the protocol address and layer 2 address of the router.

7. The system of claim 2, wherein the plurality of network devices are on common logical subnet.

8. The system of claim 2, wherein at least one network device is a virtual server.

9. The system of claim 2, wherein at least two of network devices are virtual servers executing on a common physical computer.

10. The system of claim 2, further comprising:

a translation table for storing associations between layer 2 address and protocol addresses of the first network devices, wherein the address resolution module updates the translation table to include the layer 2 address and the protocol address of the requesting network device in response to receiving a request for the network device's layer 2 address only if the requesting network device is authorized to request the layer 2 address of the first network device.

11. In a computer system comprising a communications network, at least one router coupled to the communications network and having a protocol address and a layer 2 address, a plurality of network devices coupled to the communications network, each network device having a protocol address and a layer 2 address, a computer program product executable by at least a first network device, and stored in a computer readable medium, the computer program product comprising:

a TCP/IP protocol stack having an address resolution module that is modified to respond to requests from a requesting network device for the layer 2 address of the network device only if an address of the requesting network device is included in a set of addresses of network devices authorized to request the layer 2 address of the first network device, the set being specifically associated with the first network device.

12. The computer program product of claim 11, wherein the address resolution module generates requests for the layer 2 address of another network device having a specified protocol address only if the network device executing the address resolution module is authorized to request layer 2 addresses of other network devices.

13. The computer program product of claim 11, further comprising:

a stored list of authorized address pairs, each authorized address pair including a protocol address and a layer 2 address; and wherein the address resolution module responds to a request for a layer 2 address only if the protocol address and the layer 2 address of the requesting network device match an authorized address pair on the stored list.

14. The computer program product of claim 11, wherein the address resolution module responds to requests for layer 2 addresses only if the requesting network device is the router.

15. The computer program product of claim 11, wherein the address resolution module responds to requests for layer 2 addresses only if the protocol address and the layer 2 of the requesting network device match the protocol address and layer 2 address of the router.

* * * * *